United States Patent [19]

Gottselig

[11] Patent Number: 5,002,293
[45] Date of Patent: Mar. 26, 1991

[54] PAINTER'S SERVICE CART

[76] Inventor: John C. Gottselig, 405 S. Jackson St., Wilmington, Del. 19805

[21] Appl. No.: 386,876

[22] Filed: Jul. 27, 1989

Related U.S. Application Data

[63] Continuation-in-part of Ser. No. 933,677, Nov. 20, 1986, Pat. No. D. 302,618.

[51] Int. Cl.⁵ .............................................. B62B 3/02
[52] U.S. Cl. ................................. 280/47.35; 108/145; 248/129; 248/132; 248/421; 280/79.2; 280/651
[58] Field of Search .................... 280/47.35, 639, 651, 280/37, 79.11, 79.2; 108/145, 106, 116, 26, 26.2; 248/132, 129, 421, 164, 311.2, 172; 49/382

[56] References Cited

U.S. PATENT DOCUMENTS

| D. 302,618 | 8/1989 | Gottselig | D34/23 |
|---|---|---|---|
| 1,754,974 | 4/1930 | Warfield | 248/421 |
| 2,333,732 | 11/1943 | Morris | 16/260 |
| 2,581,023 | 1/1952 | Jerick | 311/93 |
| 2,659,917 | 11/1953 | Drum | 15/121.2 |
| 2,805,905 | 9/1957 | Levitan et al. | 311/39 |
| 2,905,275 | 9/1959 | Kostolecki et al. | 188/74 |
| 2,942,290 | 6/1960 | Segal | 16/35 |
| 2,982,982 | 5/1961 | Swift | 15/257.06 |
| 2,993,675 | 7/1961 | Tatter | 248/421 |
| 3,264,672 | 8/1966 | Campbell et al. | 15/257.06 |
| 3,700,070 | 10/1972 | King | 182/16 |
| 3,822,846 | 7/1974 | Jesionowski | 248/210 |
| 3,861,328 | 1/1975 | Lawless | 248/421 |
| 3,870,333 | 3/1975 | Burdick et al. | 280/47.35 |
| 3,947,135 | 3/1976 | Hawk | 401/121 |
| 4,010,866 | 3/1977 | McClane | 220/20 |
| 4,118,002 | 10/1978 | Bartlett | 248/311.2 |
| 4,167,348 | 9/1979 | Hawk | 401/121 |
| 4,249,749 | 2/1981 | Collier | 248/421 |
| 4,638,610 | 1/1987 | Heikkinen | 108/145 |

FOREIGN PATENT DOCUMENTS 2446210 9/1980 France ................................. 280/37.34

Primary Examiner—Charles A. Marmor
Assistant Examiner—Eric Culbreth
Attorney, Agent, or Firm—Dann, Dorfman, Herrell and Skillman

[57] ABSTRACT

A mobile painter's service cart having an upper frame and a lower frame interconnected by parallel scissors-type linkages. The linkages on opposite sides of the cart are connected by transverse axles and a latching arm engages one of the axles to latch the linkage in adjusted position. The upper frame has a paint tray which can be covered by a pivoted cover having opposite support surfaces. A reversible hinge is provided to enable the cover to be reversed on the tray.

11 Claims, 2 Drawing Sheets

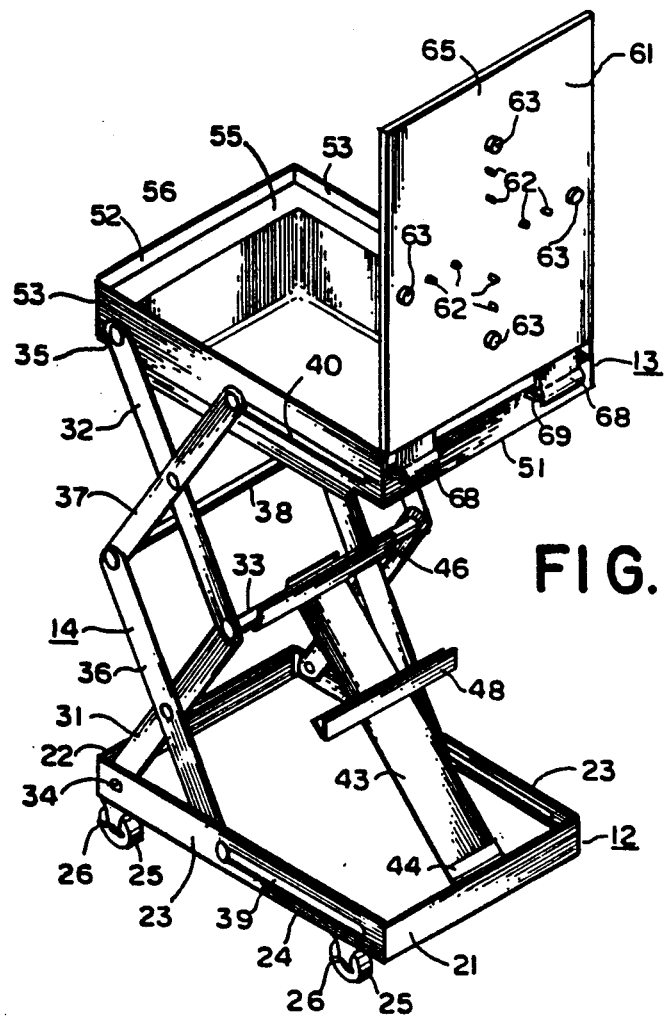
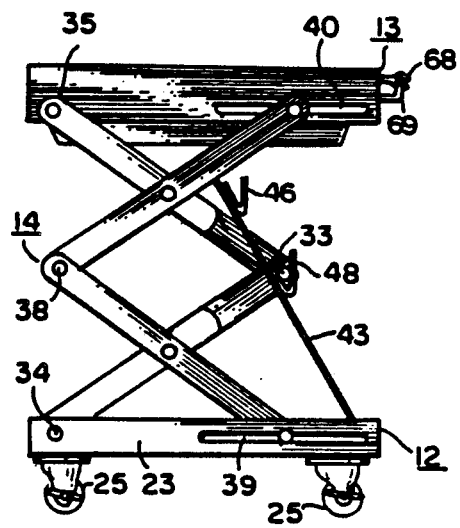
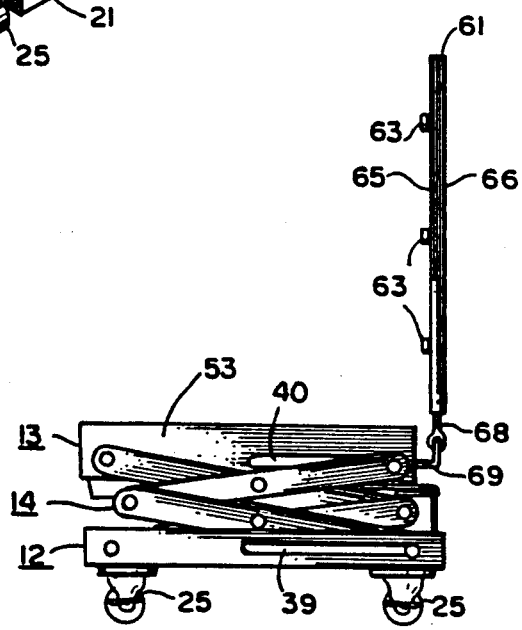
FIG. 1
FIG. 2
FIG. 3

PAINTER'S SERVICE CART

RELATED APPLICATION

This application is a continuation-in-part of my pending design patent application Ser. No. 933,677, filed Nov. 20, 1986, now U.S. Pat. No. D302,618, EC Feb. 14, 1990, issued Aug. 1, 1989.

FIELD OF THE INVENTION

The present invention relates to painters' accessories, and has particular application to a mobile cart for use by painters and painting contractors.

BACKGROUND OF THE INVENTION

A general practice for painters and painting contractors while painting in a work area is to place the paint containers and brushes on a drop cloth adjoining the area to be painted. When painting vertical surfaces, this requires considerable back-bending to use the tools, particularly when painting the upper reaches of the work area. When a ladder is available, the painter often hangs his paint buckets on the ladder, but such a procedure is not entirely satisfactory as the access to the paint is limited by the hooks used to hang the buckets. When there is a time-consuming job, it is often more efficient to erect scaffolding adjoining the work area and to use the scaffolding to support the tools and paint supplies needed for the particular job. However, for the normal job, it is not efficient to provide special aids to hold the tools, and the general practice is simply rest the paint supplies and the brushes and other tools on a drop cloth on the floor adjoining the work area.

SUMMARY OF THE PRESENT INVENTION

The present invention provides a service cart for painters which may be moved into a position adjoining the work area for providing an elevated support surface to accommodate the paint supply and brushes and other tools used by the painter in performing the tasks in the work area.

More specifically, the present invention provides a service cart having a lower frame providing a shelf for storing materials and tools, and an upper shelf frame which is adjustable in height supporting a shallow paint tray and a cover which may be displaced into position overlying the tray to serve as a support surface for paint containers with sufficient room to accommodate brushes and tools used in the work.

More specifically, the present invention provides a service cart having in the upper frame a paint tray and a cover element which is reversibly hinged to the paint tray so as to provide alternatively a surface with upwardly-projecting plugs to form a receptacle holding paint containers against lateral displacement, and an opposite surface providing a flat work area.

The service cart of the present invention is of sturdy construction which provides a firm and rigid support for the painting materials at adjustable levels. In the preferred embodiment of the invention, the upper frame is adjustably mounted for easy adjustment among several positions while loaded so that the upper frame may be readily adjusted and latched to accommodate to the work conditions required by the particular work area.

BRIEF DESCRIPTION OF THE DRAWINGS

All of the objects of the invention are more fully set forth hereinafter with reference to the accompanying drawings, wherein:

FIG. 1 is a perspective view of a service cart embodying the present invention with the upper frame at its highest level and the cover element of the upper frame raised to expose the paint tray therein;

FIG. 2 is a view in side elevation of the service cart of FIG. 1 with the upper frame in a middle position and with the cover element closing the tray in the upper frame, portions of the linkage being broken away to show the latching mechanism;

FIG. 3 is a view in side elevation of the service cart in the low position showing the cover reversed so as to provide a flat surface uppermost when the cover is moved to its closed position;

DESCRIPTION OF THE PREFERRED EMBODIMENT

Figure 4:
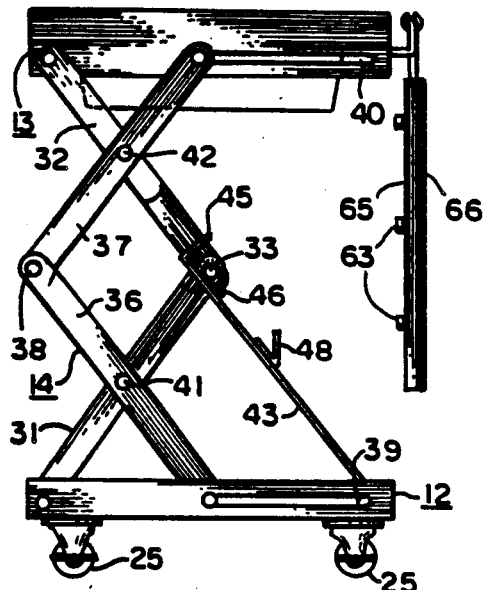
FIG. 4 is a side elevation of the service cart shown in FIG. 1 with the cover element dropped to its lowered position, portions of the linkage being broken away to show the latching mechanism.

Referring now to the drawings, and more particularly FIG. 1, the service cart of the present invention comprises a mobile chassis having a lower frame 12, an upper frame 13 and a pair of supporting linkages 14. The lower frame 12 comprises a box-like structure having front and rear upstanding walls 21 and 22, respectively, and side walls 23. A bottom 24, in the present instance a solid imperforate shell, extends between the side walls 21, 22 and 23 to provide a lower support surface for supplies and the like. The support surface 24 is of sufficient strength to support five-gallon paint containers, caulking guns and glazing compound, as needed for the particular job. On the underside of the frame 12, castors are provided at 25 to enhance the portability of the service cart and permit it to be moved from place to place. In the illustrated embodiment, the castors have locks 26 to immobilize the cart when it is properly situated, but such locking mechanisms may be dispensed with since the weight of the materials on the cart is normally sufficient to prevent it from moving once it is situated.

The linkages 14 are connected to the lower frame 12 so that the linkages may be adjusted from their retracted position shown in FIG. 3 to the fully extended position shown in FIGS. 1 and 4. In the present instance, the linkages 14 comprise parallel interconnected links which operates scissors-fashion to elevate and lower the upper frame 13 on the lower frame 12. The right and left linkages are identical and comprise a first pair of links 31 and 32 which are pivoted together by an axle 33 disposed midway between the frames 12 and 13. The lower link is pivoted to the side wall 23, as indicated at 34, and the upper link is pivoted to a side wall 53 of the upper frame 13 at a point indicated at 35. The other links 36 and 37 of the linkage are pivoted midway between the frames 12 and 13, in the present instance by an axle 38, and are connected to the walls 23 and 53 through a slotted connection at 39 and 40. Thus, the distal ends of the links 36 and 37 are free to slide in the slots 39 and 40 as the linkages are adjusted between the extended position shown in FIGS. 1 and 4 and the retracted position shown in FIG. 3. The lower links 31 and 36 are pinned together at 41 and the upper links 32 and 37 are pinned together at 42.

Means is provided to lock the linkages 14 in adjusted positions, in the present instance at either the mid position shown in FIG. 2 or the elevated position shown in FIGS. 1 and 4. To this end, a locking arm 43 is hinged to the front wall 21 of the lower frame 12 by a spring-loaded hinge 44 which biases the arm upwardly against the action of gravity. The arm 43, as shown in FIGS. 2 and 4, passes below the axle 33 and terminates in a flange 45 which is turned upwardly at the distal end of the arm 43. Adjacent the flange 45, an angular member 46 extends transversely to the arm 43 and is generally coextensive with the axle 33 as shown in FIG. 1. The angle member 46 provides a crevice between its legs which receives the axle 33 and supports the axle against downward movement. Thus, the axle 33 nests within the crevice provided by the angle member 46 when the linkage 14 is fully extended. When it is desired to lower the upper frame 13, the upper frame is held and the arm 43 is pressed downwardly so as to free the axle 33 from the crevice of the angle 46. With the arm pressed inwardly, the upper frame 13 is allowed to lower until the axle 33 passes beyond the angle 46 and then the arm is released so that the bias of the hinge 44 causes the arm to ride against the undersurface of the axle 33 as it falls into the crevice of the next angle member 48, as shown in FIG. 2. When the axle 33 rests in the crevice of the angle member 48, the upper frame 13 is firmly supported in the mid position shown in FIG. 2. The angle member 48 is substantially coextensive with the axle 33 and is rigidly mounted on the arm 43 to provide a firm support for the axle in the mid position. The axle seats within the crevice of the angle 48 and causes the upper links 32 to couple with the arm 43 to provide a diagonal strut extending from the pivot 35 at one end of the upper frame 13 to the hinge 44 at the remote end of the lower frame 12, thus assuring a firm and rigid support for the linkage in the adjusted position.

When it is desired to displace the frame to a different level, the bias of the arm 43 permits easy adjustment. When it is desired to elevate the tray back to the level shown in FIG. 4, the tray is simply lifted, causing the axle 33 to ride upwardly along the top surface of the arm 43 until it engages the lower side of the angle member 46 and the axle then displaces the arm 43 against the bias of its hinge so that the axle 33 may ride above the lip of the angle member 46 and when released, to fall into the crevice of the angle 46 to provide a firm support in the uppermost position. When it is desired to lower the tray, the tray is lifted, so as to clear the lip of the flange member 46 or 48 and the arm then is pressed downwardly against its bias to permit the upper frame 13 to be lowered to the position shown in FIG. 3. Once the axle 33 has passed below the level of the angle member 48, it is no longer necessary to press the arm downwardly, and the axle 33 may ride downwardly along the upper surface of the arm 43 to the rest position shown in FIG. 3.

Figure 6:
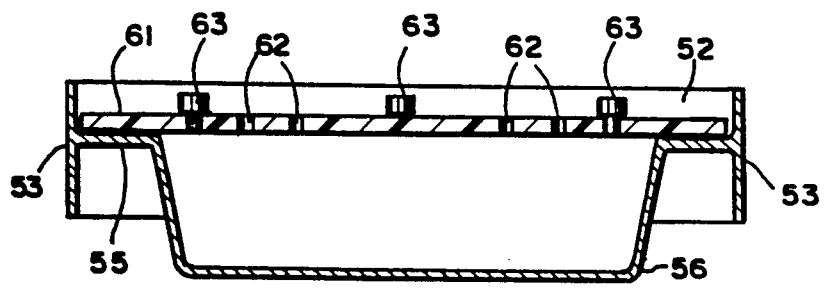
FIG. 6 is a sectional view taken on the line 6—6 of FIG. 5.

Referring to FIGS. 1 and 6, the upper frame 13 comprises a rectangular framework having front and rear walls 51 and 52 and side walls 53. Within the frame 13, a transverse partition 55 extends inwardly from a point below the tops of the walls 52 and 53 which partition is dished in the middle at 56 to provide a shallow paint tray which may be used for receiving liquid paint or other material. The tray is preferably of a size to accommodate a roller and a conventional roller screen may be used within the tray 56. Alternatively, the disked portion of the tray may have an inclined bottom surface to provide a ramp for loading a paint roller with paint from the tray. As shown in FIG. 1, the front wall 51 of the frame 13 terminates below the level of the tops of the walls 52 and 53 and is at the level of the partition 55 so that the top of the frame 13 provides a three-sided enclosure around the partition 55.

Figure 5:
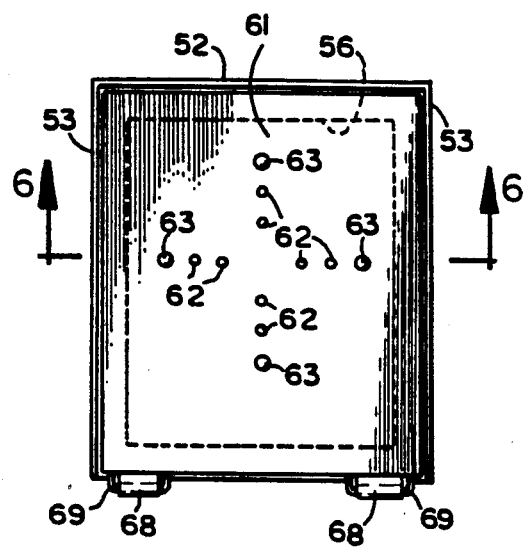
FIG. 5 is a plan view of the service cart as shown in FIG. 2.

A cover is provided for the tray 56 so as to provide alternative support surfaces at the top of the frame 13. To this end, a generally flat cover element 61 is provided to rest on the partition 55 and cover the paint tray 56. The cover element 61 is preferably a rigid plastic having, at least on one surface thereof, a pattern of sockets 62 adapted to receive projections in the form of rubber plugs 63. In the present instance, as shown in FIG. 5, the pattern of the sockets 62 is cruciform. When the plugs 63 are inserted in the outermost sockets, they provide a receiving area therebetween which corresponds to a large size paint container, such as a five-gallon bucket. By shifting the plugs 63 into the next sockets in the cruciform, the plugs will define a receiving area for a smaller sized container, such as a two-gallon container and by shifting the plugs to the innermost sockets, the plugs define a receiving area comforming in diameter in a one-gallon container. The plugs project above the one surface of the cover 61, leaving the other surface planar. The surface with the projections is indicated at 65 and the planar surface is indicated at 66 in FIGS. 3 and 4. As shown in these figures, the cover is reversible so that when it is closed onto the partition 55, either surface 65 or 66 may be disposed upwardly. In the present instance, the reversal of the cover 61 is effected by reversible hinges 68 which engage hinge pins 69 projecting from the front edge 51 of the frame 13. The reversible hinges may be simply a resilient plastic material having a slotted opening which will accommodate the hinge pins 69 and is sufficiently flexible to afford disengagement of the hinges 68 from the pins 69 and reversal of the cover 61 so as to dispose the desired surface upwardly when it is in position on the partition 55.

While a particular embodiment of the present invention has been herein illustrated and described, it is not intended to limit the invention to such disclosure, but changes and modifications may be made therein and thereto within the scope of the following claims.

I claim:

1. Painter's service cart for use in a work area having a floor comprising a mobile chassis having means to support the chassis for movement across the floor of the work area, said chassis having a bottom support frame having upstanding side edges to provide a box-like structure for receiving painter's supplies, an upper support frame having upright edges to provide a second box-like structure, a pair of extensible parallel linkages connecting the edges of said bottom and upper support frames to support the upper frame on said bottom frame for vertical adjustment, means to lock said linkages in a plurality of adjustments providing low, medium, and high heights of said upper frame relative to said bottom frame, a shallow paint tray mounted in said upper frame, and a cover member having opposed first and second support surfaces, and a hinge at one end coupled to one end of said frame for pivotal displacement of the cover between a closed position overlying said shallow paint tray and an open position exposing said paint tray, said hinge being reversibly coupled to dispose said first and second support surfaces alternatively facing up when said cover member is in its closed position, said first support surface of said cover member having pattern of sockets, and a plurality of plugs having lower parts slidably engageable in said sockets and upper parts projecting upwardly from said support surface and providing therebetween a receptacle arranged to receive the bottom of a paint container and retaining the container against lateral movement on said first surface.

2. A cart according to claim 1 wherein the upper parts of said plugs are rubber, and said sockets are disposed in a cruciform pattern.

3. A painter's service cart for use in a work area having a floor comprising a mobile chassis having means to support the chassis for movement across the floor of the work area, said chassis having a bottom support frame having upstanding side edges to provide a box-like structure for receiving painter's supplies, an upper support frame having upright edges to provide a second box-like structure, a pair of extensible parallel linkages connecting the edges of said bottom and upper support frames to support the upper frame on said bottom frame for vertical adjustment, means to lock said linkages in a plurality of adjustments providing low, medium, and high heights of said upper frame relative to said bottom frame, a shallow paint tray mounted in said upper frame, and a cover member having opposed first and second support surfaces, and a hinge at one end coupled to one end of said frame for pivotal displacement of the cover between a closed position overlying said shallow paint tray and an open position exposing said paint tray, said hinge being reversibly coupled to dispose said first and second support surfaces alternately facing up when said cover member is in its closed position, each of said parallel linkages comprising four links pivoted together scissor-fashion, two of said links being pivotally connected together by an axle midway between said bottom and upper frames extending transverse to the cart between said parallel linkages, the upper and lower ends of said interconnected two links being pivotally connected to said upper and bottom frames, respectively, adjacent the end remote from said one end of the upper frame which mounts the hinge of the cover member, the remaining two links of each linkage being pivoted together midway between said upper and bottom frames and having individual separate sliding connections with said frames at their distal ends, so as to avoid substantial projection of said sliding connections into the interior of the box-like structures of said bottom and upper support frames.

4. A cart according to claim 3 wherein said locking means for said linkages comprises a locking arm pivoted to said lower frame and extending upwardly to engage against said axle, a plurality of latches on said arm to engage under said axle, each of said latches, when engaged under said axle, supporting said linkages against downward displacement to thereby position said upper frame at a selected level above said bottom frame.

5. A cart according to claim 4 wherein said arm is biased toward said axle, and each latch comprises a transverse angle member substantially coextensive with said axle, and having an upper surface providing a crevice receiving the underside of said axle, the lower surface of said angle member providing a ramp enabling the axle to displace said arm against said bias when the axle is displaced upwardly along said arm.

6. A cart according to claim 5 wherein said arm is pivoted to said bottom frame with a spring-loaded hinge which provides said bias.

7. A cart according to claim 6 wherein said hinge is connected to the end of the bottom frame below the hinge of the cover member, said arm projecting upwardly underneath said axle, said spring-loaded hinge overriding the gravitational force tending to disengage said arm from said axle.

8. Painter's service cart for use in a work area having a floor comprising a mobile chassis having means to support the chassis for movement across the floor of the work area, said chassis having a bottom support frame having upstanding side edges to provide a box-like structure for receiving painter's supplies, an upper support frame having upright edges to provide a second box-like structure, a pair of extensible parallel linkages connecting the edges of said bottom and upper support frames to support the upper frame on said bottom frame for vertical adjustment, each of said parallel linkages comprising four links pivoted together scissor-fashion, a first axle pivotally connecting a first two of said links midway between said bottom and upper frames extending transverse to the cart between said parallel linkages, the upper and lower ends of the first two interconnected links being pivotally connected to said upper and bottom frames, respectively, adjacent one end of the frames, a second axle pivotally connecting the remaining two links of each linkage midway between said upper and bottom frames, said remaining links having a sliding connection with said frames at their distal ends, a locking arm to lock said linkages in a plurality of adjustments providing low, medium, and high heights of said upper frame relative to said bottom frame, said locking arm pivoted to said lower frame and extending upwardly to engage against said first axle, a plurality of latches on said arm to engage said first axle, each of said latches, when engaged with said axle, supporting said linkages against downward displacement to thereby position said upper frame at a selected level above said bottom frame, a paint tray mounted in said upper frame, and a cover member having a hinge at one end coupled to one end of said frame for pivotal displacement of the cover between a closed position overlying said shallow paint tray and an open position exposing said paint tray.

9. A cart according to claim 8 wherein said arm is biased toward said axle, and each latch comprises a transverse angle member substantially coextensive with said axle, and having an upwardly facing crevice engaging under said axle, the lower surface of said angle member providing a ramp enabling the axle to displace said arm agaisnt said bias when the axle is displaced upwardly along said arm.

10. A cart according to claim 9 wherein said arm is pivoted to said bottom frame with a spring-loaded hinge which provides said bias.

11. A cart according to claim 8 wherein said locking arm is pivotally connected to the end of the bottom frame remote from said one end of the frame where said first two links are pivotally connected, said locking arm extending upwardly from said bottom frame, whereby said upper link of said first two links and said locking arm cooperate to form a diagonal strut extending between said one end of the upper frame and said remote end of the lower frame.

* * * * *